(12) United States Patent
Liu (10) Patent No.: US 12,100,564 B2
(45) Date of Patent: Sep. 24, 2024

(54) KEYBOARD WITH A TWO-WAY ROTATING SUPPORT FRAME

(71) Applicant: Fubing Liu, Shenzhen (CN)

(72) Inventor: Fubing Liu, Shenzhen (CN)

( * ) Notice: Subject to any disclaimer, the term of this patent is extended or adjusted under 35 U.S.C. 154(b) by 0 days.

(21) Appl. No.: 17/957,279

(22) Filed: Sep. 30, 2022

(65) Prior Publication Data

US 2024/0055200 A1    Feb. 15, 2024

(30) Foreign Application Priority Data

Aug. 12, 2022   (CN) .......................... 202222123202.8

(51) Int. Cl.
*H01H 13/86* (2006.01)
*G06F 1/16* (2006.01)

(52) U.S. Cl.
CPC .......... *H01H 13/86* (2013.01); *G06F 1/1669* (2013.01)

(58) Field of Classification Search
CPC ......... H01H 2231/016; H01H 2223/00; H01H 2223/01; H01H 2223/012; H01H 2223/018; H01H 2223/02; H01H 2223/028; H01H 2223/04; H01H 2223/042; H01H 2223/044; H01H 2223/046; H01H 2223/048; H01H 2223/05; H01H 13/00; H01H 13/04; H01H 13/10; H01H 13/12; H01H 13/86; H01H 21/00; H01H 21/04; H01H 21/08; H01H 63/34; H01H 2009/02; H01H 2009/04; G06F 1/16; G06F 1/1601; G06F 1/1637; G06F 1/1607; G06F 1/1613; G06F 1/162; G06F 1/1622; G06F 1/1669; G06F 1/1681; G06F 1/1616; G06F 1/1654; G06F 1/1665; G06F 1/1633
See application file for complete search history.

(56) References Cited

U.S. PATENT DOCUMENTS

| | | | | |
|---|---|---|---|---|
| 5,335,142 A | * | 8/1994 | Anderson | G06F 1/1681 361/679.55 |
| 7,113,397 B2 | * | 9/2006 | Lee | G06F 1/1679 361/679.55 |
| 9,501,106 B2 | * | 11/2016 | Senatori | G06F 1/162 |
| 2010/0039764 A1 | * | 2/2010 | Locker | G06F 1/1615 361/679.29 |

* cited by examiner

*Primary Examiner* — Anthony R Jimenez
(74) *Attorney, Agent, or Firm* — ScienBiziP, P.C.

(57) ABSTRACT

A keyboard with a two-way rotating support frame is provided. The keyboard includes a keyboard body, a mount arranged on the keyboard body, a first rotating member, and a second rotating member. The first rotating member is rotatably mounted on the mount and can be rotated around a first rotation axis; the second rotating member is rotatably mounted on the first rotating member and can rotate relative to the first rotating member around a second rotation axis. The second rotating member includes a support frame which includes a stand base, and a supporting main frame detachably connected to the stand base. The supporting main frame is used for supporting electronic device with a screen.

9 Claims, 7 Drawing Sheets

KEYBOARD WITH A TWO-WAY ROTATING SUPPORT FRAME

RELATED APPLICATIONS

This application claims the benefit of priority to Chinese Patent Application Number 202222123202.8 filed on Aug. 12, 2022, in China National Intellectual Property Administration, the contents of which are hereby incorporated by reference.

TECHNICAL FIELD

The present disclosure relates to the art of keyboard, and in particular relates to a keyboard with a two-way rotating support frame.

BACKGROUND

With the development of technology, some keyboards are often provided with a support frame, by which to support an electronic device (such as a tablet computer, etc.) with a screen. The keyboard with a support frame generally includes a keyboard body and a support frame; the support frame is rotatably mounted on the keyboard body and can be rotated around a horizontal axis, so that the support frame can be opened and closed. However, the support frame can only be rotated around the horizontal axis relative to the keyboard body, but cannot be rotated around the vertical axis, resulting in the inability to adjust the orientation of the screen of the electronic device fixed on the support frame, thus limiting the flexibility of its use. Moreover, the support frame is integrally formed and cannot be disassembled for independent use.

SUMMARY OF INVENTION

To solve the disadvantages existing in the prior art, the purpose of the present disclosure is to provide a keyboard with a two-way rotating support frame, enabling the support frame to rotate around a first rotation axis and also around a second rotation axis, the second rotation axis being perpendicular to the first rotation axis, which improves the flexibility of use, and the supporting main frame of the support frame is detachably connected with the stand base, so that it is convenient to be disassembled and used independently.

The present disclosure adopts the following technical solutions:

A keyboard with a two-way rotating support frame, comprising a keyboard body, a mount arranged on the keyboard body, a first rotating member, and a second rotating member; the first rotating member is rotatably mounted on the mount and can be rotated around a first rotation axis; the second rotating member is rotatably mounted on the first rotating member and can rotate relative to the first rotating member around a second rotation axis; one of the first rotation axis and the second rotation axis is a vertical axis, and the first rotation axis is perpendicular to the second rotation axis; the second rotating member includes a support frame; the support frame includes a stand base, and a supporting main frame detachably connected to the stand base; the supporting main frame is used for supporting electronic device with a screen.

The second rotating member further includes a first transverse rotating rod and a second transverse rotating rod; the first transverse rotating rod is rotatably mounted on one end of the first rotating member, and the second transverse rotating rod is rotatably mounted on the other end of the first rotating member; the stand base is fixedly connected with the first transverse rotating rod and the second transverse rotating rod.

The central axis of the first transverse rotating rod coincides with the central axis of the second transverse rotating rod; the second rotation axis is the central axis of the first transverse rotating rod; both the first transverse rotating rod and the second transverse rotating rod are arranged horizontally.

The mount includes a sleeve shaft, and the first rotating member is rotatably sleeved on the sleeve shaft; the sleeve shaft is vertically arranged, and the first rotation axis is the central axis of the sleeve shaft.

The keyboard with the two-way rotating support frame further includes the matching device comprises a movable part; the movable part is movably installed in the installation cavity of the sleeve shaft, and extends through the opening; the first rotating member is provided with an insertion hole, the sleeve shaft is insertable through the insertion hole, a spring is installed in the installation cavity, the spring abuts against the movable part and is configured to provide an elastic force to urge the movable part to move towards the first rotating member; a plurality of embedding grooves is defined on a hole wall of the insertion hole, the plurality of embedding grooves is circumferentially arranged around the central axis of the sleeve shaft and configured for the movable parts to embed; surface of the hole wall of the insertion hole between adjacent two of the plurality embedding grooves is configured to abut against the movable part.

The plurality of embedding grooves are equiangular circularly arranged around the central axis of the sleeve shaft; a number of the embedding grooves is an even number, two movable parts are movably installed in the installation cavity; the spring abuts between the two movable parts; the sleeve shaft is provided with two openings corresponding to the two movable parts one-to-one, the movable parts are configure to extend through the two opening respectively; one of the openings communicates with one end of the installation cavity, and another one of the openings communicates with the other end of the installation cavity; the installation cavity extends along the radial direction of the sleeve shaft; both sides of the embedding groove are provided with a guiding arc surface or a guiding inclined surface.

The stand base is provided with a first matching member, and the supporting main frame is provided with a second matching member, and the first matching member is used for inserting and matching with the second matching member.

The stand base is provided with a first magnetic member, the supporting main frame is provided with a second magnetic member; the second magnetic member is configured to magnetically attract the first magnetic member; the second matching member is an insertion groove arranged on the supporting main frame, and the first matching member is an insertion part arranged on the stand base; one of the first magnetic member and the second magnetic member is a first magnet bar, the other is an iron bar or a second magnet bar; and the insertion part is rectangular shaped or T-shaped, and a shape of the insertion groove matches a shape of the insertion part.

The supporting main frame includes a first plate body detachably connected to the stand base, and a bearing seat rotatably connected to the first plate body; the bearing seat comprising a second plate body and a third plate body fixed on the second plate body; a first magnetic member is arranged between the second plate body and the third plate body, and the first magnetic member is magnetically attracts the electronic device with a screen; the first plate body is provided with a second magnetic member.

The electronic device with a screen is a display screen or a tablet computer; the keyboard body is a wireless keyboard body.

FEATURE EFFECTS OF DISCLOSURE

Compared with the prior art, the advantageous effects of the present disclosure are as below:

The present disclosure provides a keyboard with a two-way rotating support frame. By reasonably arranging the keyboard body, the mount, the first rotating member, and the second rotating member, the support frame can be rotated around the first rotation axis and can be rotated around the second rotation axis perpendicular to the first rotation axis, which improves the flexibility of use. Moreover, the supporting main frame of the support frame is detachably connected to the stand base, so that the supporting main frame can be disassembled and independently used for support apart from the keyboard body; in addition, due to the use of a matching device, the sound emitted by the movable parts embedded in the embedding grooves under the elastic action of the spring is also convenient for the user to understand the rotation of the first rotating member and improves the user experience.

BRIEF DESCRIPTION OF DRAWINGS

Implementations of the present disclosure will now be described, by way of embodiment, with reference to the attached figures.

DETAILED DESCRIPTION

Hereinafter, the present disclosure will be further described with reference to the drawings and specific embodiments. It should be noted that, on the premise of no conflict, the embodiments or technical features described below can be combined arbitrarily to form new embodiments.

Referring to FIGS. 1-11, a keyboard with a two-way rotating support frame, including a keyboard body 71, a mount 10 arranged on the keyboard body 71, a first rotating member 20, and a second rotating member 80; the first rotating member 20 is rotatably mounted on the mount 10 and can be rotated around a first rotation axis L1; the second rotating member 80 is rotatably mounted on the first rotating member 20 and can rotate relative to the first rotating member 20 around a second rotation axis L2; one of the first rotation axis and the second rotation axis is a vertical axis, and the first rotation axis is perpendicular to the second rotation axis; the second rotating member 80 includes a support frame 90; the support frame 90 includes a stand base 91, and a supporting main frame 92 detachably connected to the stand base 91; the supporting main frame 92 is used for supporting electronic device 72 with a screen.

During use, the electronic device 72 with a screen, such as a tablet computer, is fixed on the supporting main frame 92. By applying a pushing force, the second rotating member 80 can be rotated around the first rotation axis along with the first rotating member 20, so that the angle of the second rotating member 80 can be adjusted around the first rotation axis. By applying a pushing force to the second rotating member 80, the second rotation member 80 can also be rotated around the second rotation axis relative to the first rotating member 20, so that the angle of the second rotating member 80 can be adjusted around the second rotation axis. It follows that the support frame 90 can be rotated both around the first rotation axis and around the second rotation axis perpendicular to the first rotation axis, and as one of the first rotation axis and the second rotation axis is a vertical axis, and the first rotation axis is perpendicular to the second rotation axis, that is, the support frame 90 can rotate around a vertical axis and a horizontal axis, so that the electronic device 72 fixed on the supporting main frame 92 can be rotated around the horizontal axis along with the second rotating member 80, which is convenient for opening and closing, and it is also convenient for the electronic device 72 fixed on the supporting main frame 92 to rotate around the vertical axis along with the second rotating member 80, so that the orientation of the screen can be adjusted. Moreover, the electronic device 72 can also be adjusted to a state where the back of which against the keyboard body 71 and the screen face upwards, which is beneficial to the designers or other working people and can improve the flexibility of use. Moreover, since the supporting main frame 92 of the support frame 90 is detachably connected to the stand base 91, the supporting main frame 92 can be dissembled from the stand base 91 and can be used apart from the keyboard body 71 to independently support the electronic device 72 with a screen.

Figure 1:
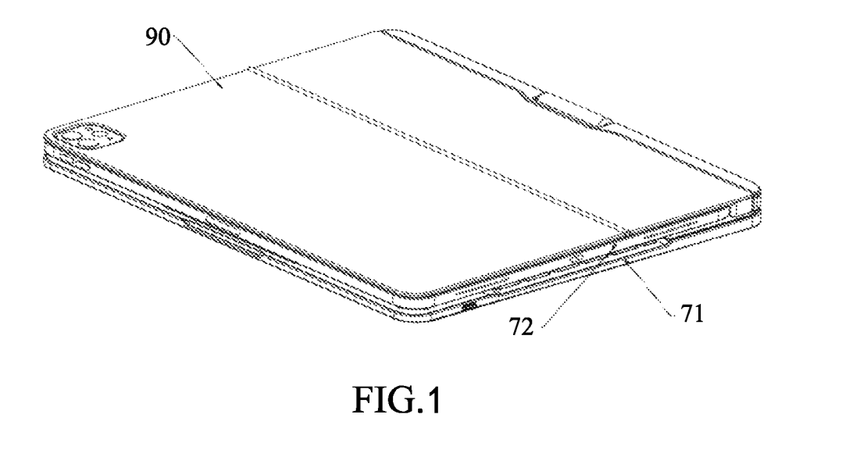
FIG. 1 is a schematic view of a structure of a keyboard according to the present disclosure.
Figure 2:
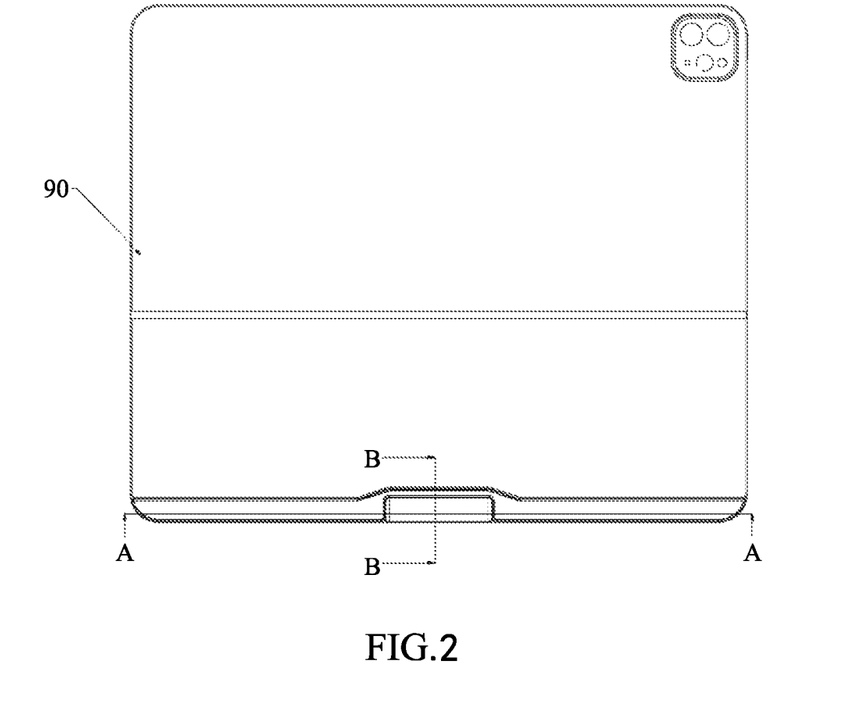
FIG. 2 is a top plan view of the keyboard.
Figure 3:
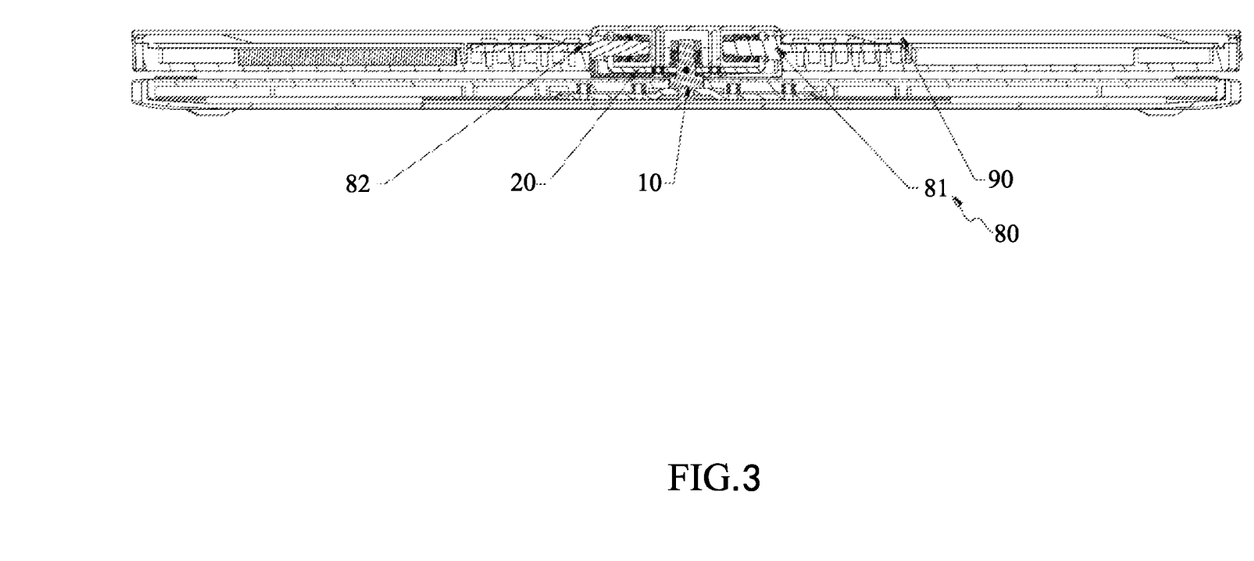
FIG. 3 is a cross-sectional view of the keyboard, taken along section line A-A as depicted in FIG. 2.
Figure 4:
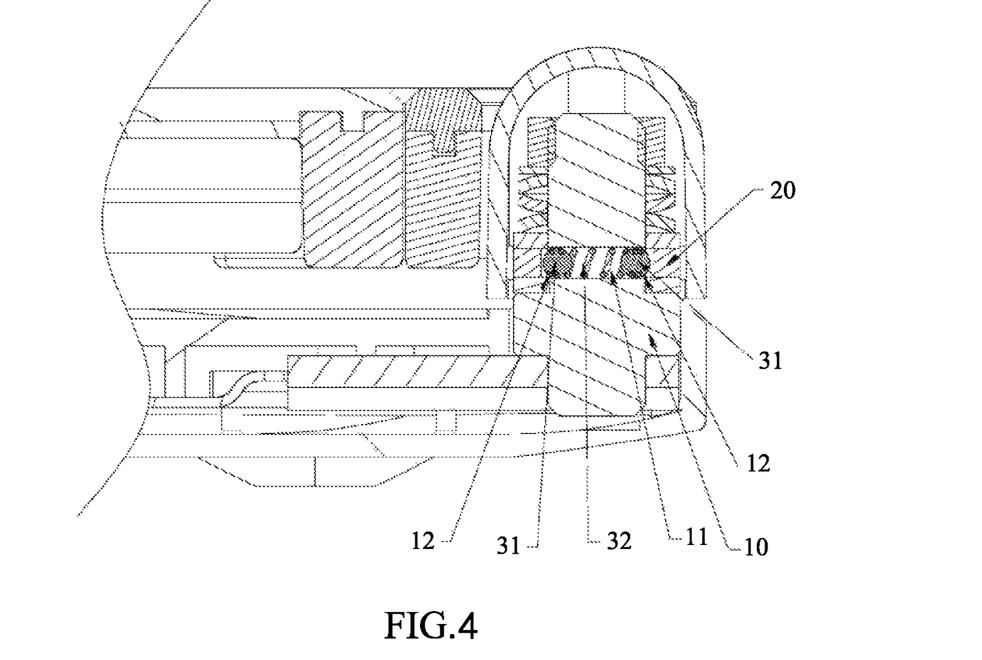
FIG. 4 is a partial cross-sectional view of the keyboard, taken along section line B-B as depicted in FIG. 2.
Figure 5:
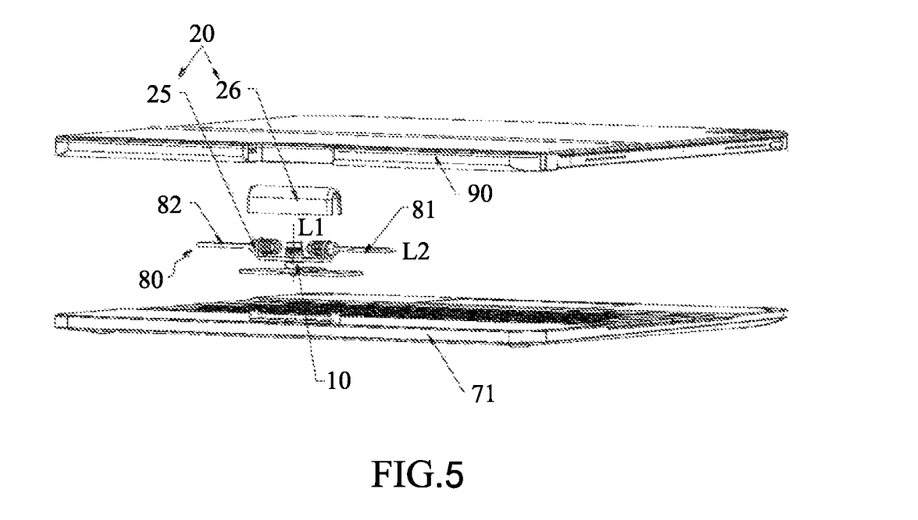
FIG. 5 is an exploded view of the keyboard.
Figure 6:
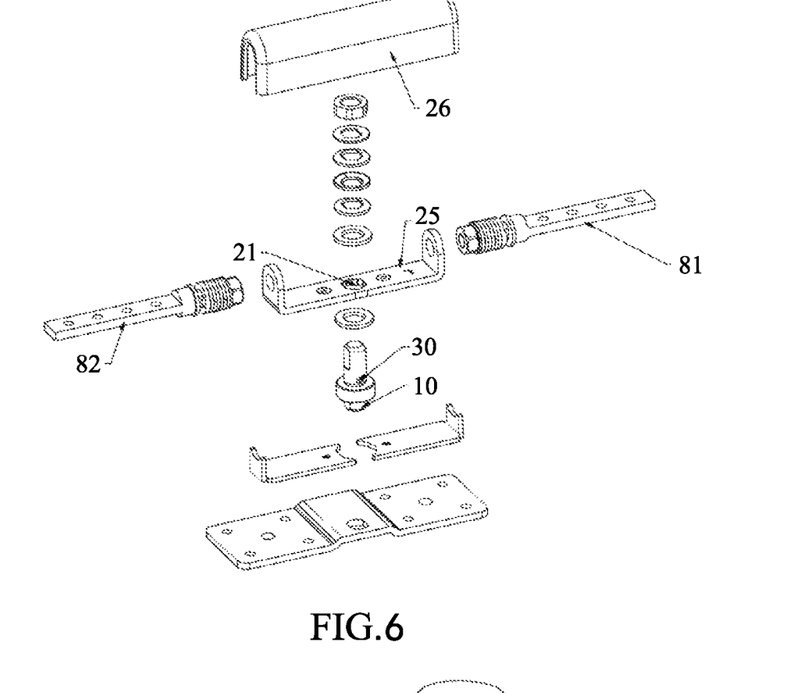
FIG. 6 is a schematic view of a first transverse rotating rod, a second transverse rotating rod, and A first rotating member of the keyboard in a separation state.

The second rotating member 80 further includes a first transverse rotating rod 81 and a second transverse rotating rod 82; the first transverse rotating rod 81 is rotatably mounted on one end of the first rotating member 20, and the second transverse rotating rod 82 is rotatably mounted on the other end of the first rotating member 20; the stand base 91 is fixedly connected with the first transverse rotating rod 81 and the second transverse rotating rod 82. By adopting the above structure, the connection stability of the support frame 90 can be improved.

Further, both the first transverse rotating rod 81 and the second transverse rotating rod 82 are arranged horizontally to facilitate connection, that is, both the first transverse rotating rod 81 and the second transverse rotating rod 82 are arranged along the second rotation axis L2.

Further, the central axis of the first transverse rotating rod 81 coincides with the central axis of the second transverse rotating rod 82; the second rotation axis is the central axis of the first transverse rotating rod 81.

The mount 10 includes a sleeve shaft, and the first rotating member 20 is rotatably sleeved on the sleeve shaft to facilitate installation.

In this embodiment, the mount 10 further includes a bottom plate fixed on the keyboard body 71, and the sleeve shaft is fixed on the bottom plate. Of course, the mount 10 can only adopt the sleeve shaft, and in addition, the mount 10 can also adopt other structures according to actual needs. However, the use of a sleeve shaft for the mount 10 is the optimum embodiment of the present disclosure, which can facilitate the matching of the first rotating member 20.

Further, the sleeve shaft is vertically arranged, and the first rotation axis is the central axis of the sleeve shaft.

Figure 7:
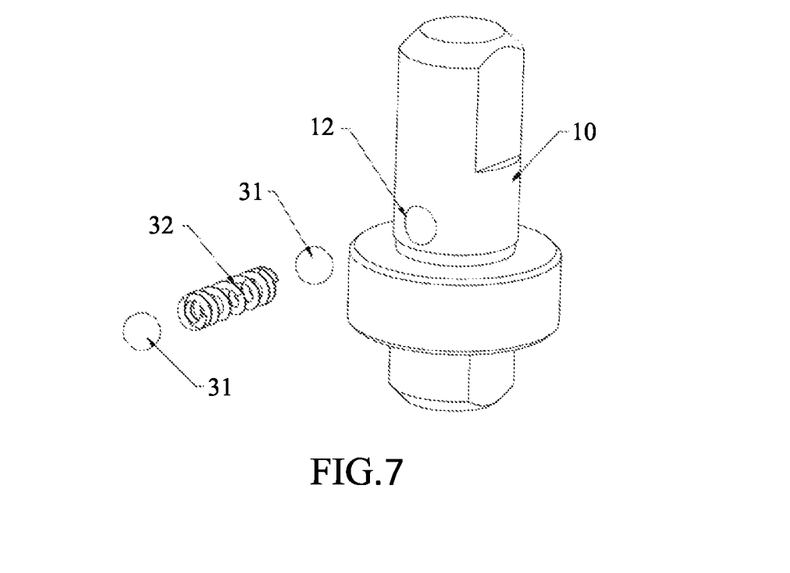
FIG. 7 is an exploded view of a matching device.
Figure 8:
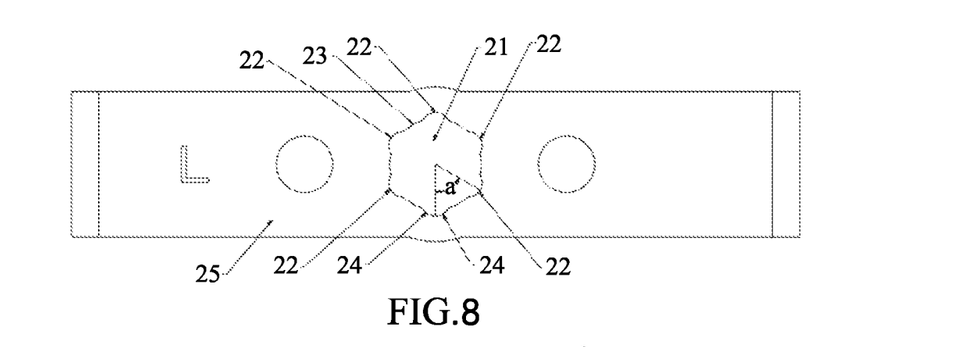
FIG. 8 is a top plan view of the first rotating member.

The keyboard with the two-way rotating support frame 90 further includes a matching device 30 installed on the sleeve shaft; the matching device 30 includes a movable part 31; the sleeve shaft is provided with an installation cavity 11; the movable part 31 is movably installed in the installation cavity 11; the sleeve shaft is also provided with an opening 12 that communicates with the installation cavity 11 and is used for the movable part 31 to extend; the first rotating member 20 is provided with an insertion hole 21, into which the sleeve shaft is inserted, and the installation cavity 11 is also installed with a spring 32; the spring 32 abuts against the movable part 31 and is used to provide an elastic force to urge the movable part 31 to move towards the first rotating member 20; a plurality of embedding grooves 23 is defined on the hole wall of the insertion hole 21, the plurality of embedding grooves 23 is circumferentially arranged around the central axis of the sleeve shaft and are configured for the movable part 31 to embed into the insertion hole 21; surface of the hole wall of the insertion hole 21 between adjacent two of the plurality embedding grooves 22 is configured to abut against the movable part 31. During use, when the first rotating member 20 is rotated around the central axis of the sleeve shaft, the abutting surface 23 rotates along with the first rotating member 20, and the movable part 31 abuts against the abutting surface 23. At this time, the spring 32 is in a retracted state, and when the embedding groove 22 rotates to face the movable part 31 along with the first rotating member 20, the movable part 31 rebounds under the elastic force of the spring 32 and embedded in the embedding groove 22, and the sound emitted when the movable part 31 collide with the wall of the embedding groove 22 is also convenient for the user to understand the rotation of the first rotating member 20 and improves the user experience.

Further, the plurality of embedding grooves 22 are arranged in an equiangular circle around the central axis of the sleeve shaft, that is, the interval angle α between any two adjacent embedding grooves 22 is equal, so that each time the first rotating member 20 rotates the same predetermined angle (i.e. the interval angle of the embedding grooves 22), it can give the user an acoustic feedback of rotating the predetermined angle by having the movable part 31 embedded in the embedding grooves 22. Wherein, the interval angle α between any two adjacent embedding grooves 22 can be set according to the setting requirements, for example, it can be set to 30 degrees, 45 degrees, or 60 degrees.

Wherein, the number of the embedding grooves 22 can be set according to actual needs, for example, it can be set as an odd number or an even number. As the optimum embodiment of the present disclosure, the number of the embedding grooves 22 is an even number, two movable parts 31 are movably installed in the installation cavity 11; the spring 32 abuts between the two movable parts 31; the sleeve shaft is provided with two openings 12 corresponding to the two movable parts 31 one-to-one, the movable parts 31 are configure to extend through the two opening 12 respectively; one of the openings 12 communicates with one end of the installation cavity 11, and another one of the opening 12 communicates with the other end of the installation cavity 11, so that the feedback sound can be increased by embedding the two movable parts 31 in the two opposite embedding grooves 22 respectively.

Further, the installation cavity 11 extends along the radial direction of the sleeve shaft, so as to facilitate processing.

Further, both sides of the embedding groove 22 are provided with a guiding arc surface 24 or a guiding inclined surface, and in the process that the embedding groove 22 rotates with the first rotating member 20 to the position corresponding to the movable part 31, through the guiding arc surface 24 or the guiding inclined surface, it is convenient for the movable part 31 to be embedded in place. By continuously applying pushing force, the first rotating member 20 is rotated, and through the guiding arc surface 24 or the guiding inclined surface, it is convenient for the embedding groove 22 separates from the movable part 31.

Wherein, the first rotating member 20 includes a rotating base 25 rotatably sleeved on the sleeve shaft, and a cover 26 fixedly connected to the rotating base 25 and covering the sleeve shaft, so as to reduce the collision damage caused by the exposition of the sleeve shaft, and can improve the aesthetic effect of appearance. The first transverse rotating rod 81 is rotatably mounted on one end of the rotating base 25, and the second transverse rotating rod 82 is rotatably mounted on the other end of the rotating base 25. The insertion hole 21 and the embedding grooves 22 are both formed on the rotating base 25.

Figure 10:
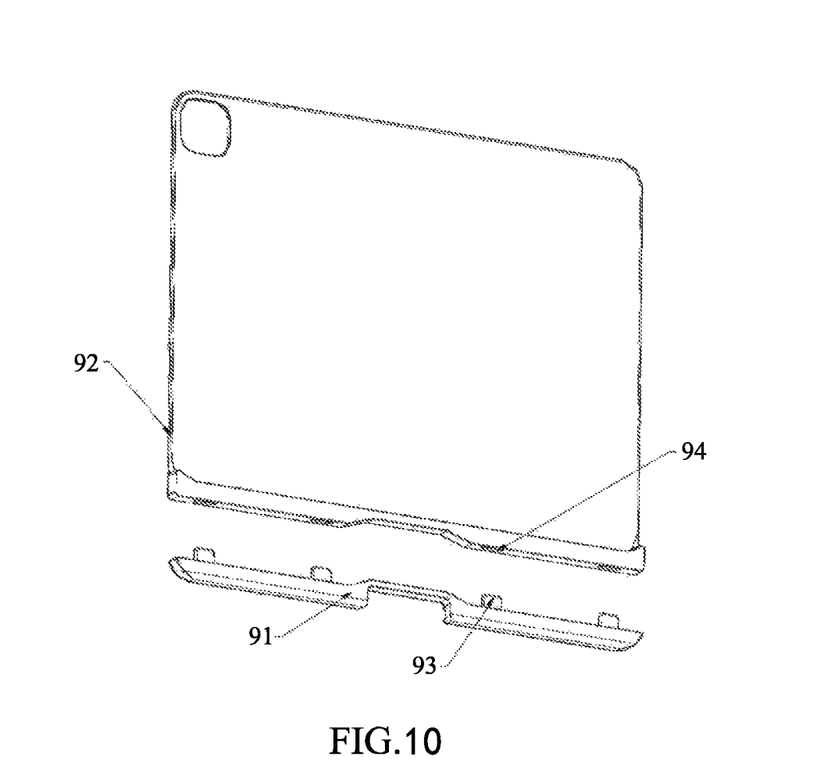
FIG. 10 is an exploded schematic view of the support frame.

The stand base 91 is provided with a first matching member 93, and the supporting main frame 92 is provided with a second matching member 94, and the first matching member 93 is used for inserting and matching with the second matching member 94, so as to facilitate the installation between the stand base 91 and the supporting main frame 92.

Further, the stand base 91 is provided with a first magnetic member 97, the supporting main frame 92 is provided with a second magnetic member 98; the second magnetic member 98 is used to magnetically attract the first magnetic member 97. During use, by inserting and matching the first matching member 93 and the second matching member 94, and by making the supporting main frame 92 and the stand base 91 fixed together through the magnetic attraction between the first magnetic member 97 and the second magnetic member 98, the assembly between the supporting main frame 92 and the stand base 91 can be completed; by applying a pulling force greater than the magnetic force to pull the supporting main frame away from the stand base 91, the first matching member 93 separates from the second matching member 94, thus the disassembly between the supporting main frame 92 and the stand base 91 can be finished. Of course, in addition to this, the stand base 91 and the supporting main frame 92 can also be connected by means of screws, snaps, etc., and the disassembly between the stand base 91 and the supporting main frame 92 can also be realized. However, using the combination of the first magnetic member 97, the second magnetic member 98, the first matching member 93 and the second matching member 94 is the optimum embodiment of the present disclosure, which can ensure the stable connection between the stand base 91 and the supporting main frame 92, and can also make the assembly and disassembly between the stand base 91 and the supporting main frame 92 more convenient and fast, which can greatly save time. Since the supporting main frame 92 is detachably connected to the stand base 91, it is convenient to separate the supporting main frame 92 from the stand base 91, so as to facilitate the use of the supporting main frame 92 as an independent supporting bracket, to support the electronic device 72 with a screen, so as to facilitate the user to use in multiple scenarios.

The second matching member 94 is an insertion groove arranged on the supporting main frame 92, and the first matching member 93 is an insertion part arranged on the stand base 91. Of course, in addition to this, in order to realize the insertion and matching of the first matching member 93 and the second matching member 94, the first matching member 93 can also be set as the embedding grooves 22 provided on the stand base 91, and the second matching member 93 can be set as an insertion part provided on the supporting main frame 92. However, setting the second matching member 94 as the insertion grooves provided on the supporting main frame 92 and setting the first matching member 93 as the insertion part provided on the stand base 91 is the optimum embodiment of the present disclosure, which facilitates for the supporting main frame to place and use after the supporting main frame 92 and the stand base 91 being separated, and is convenient for processing.

Figure 12:
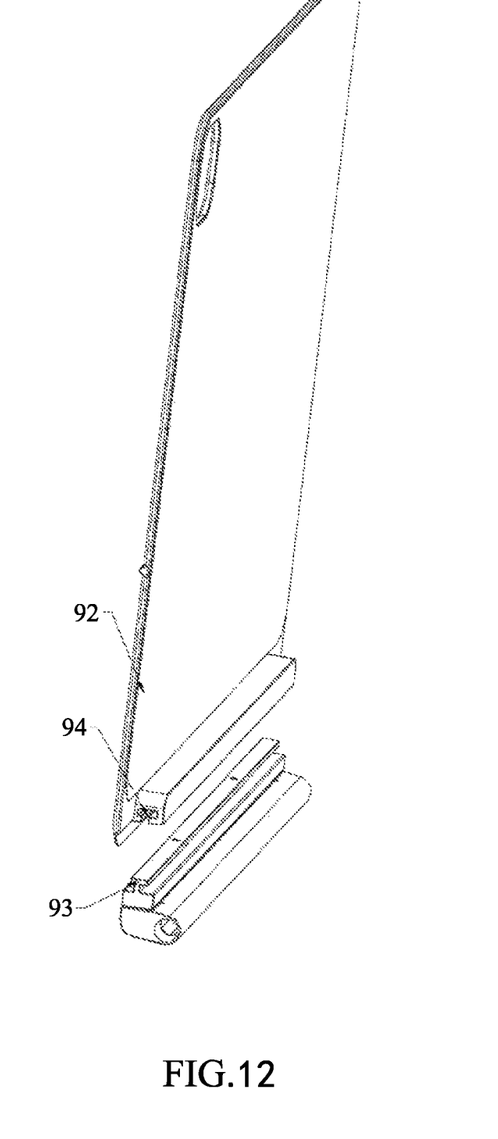
FIG. 12 is a schematic view of a structure of another embodiment of a support frame of a keyboard according to the present disclosure.

Wherein, the shape of the insertion part can be set according to actual needs, for example, it can be set as rectangles as shown in FIG. 10, and as a T-shape as shown in FIG. 12, etc.

One of the first magnetic member 97 and the second magnetic member 98 is set as a first magnet bar, the other is set as a second magnet bar, so that the supporting main frame 92 and the stand base 91 can be fixed together through the magnetic attraction between the first magnetic member 97 and the second magnetic member 98. Of course, in addition to this, one of the first magnetic member 97 and the second magnetic member 98 can be set as a first magnet bar, the other is an iron bar, or the like. However, setting the first magnetic member 98 as the first magnet bar and the second magnetic member 98 as the second magnet bar is the optimum embodiment of the present disclosure, which can ensure the magnetic attraction force and can effectively control costs.

Figure 9:
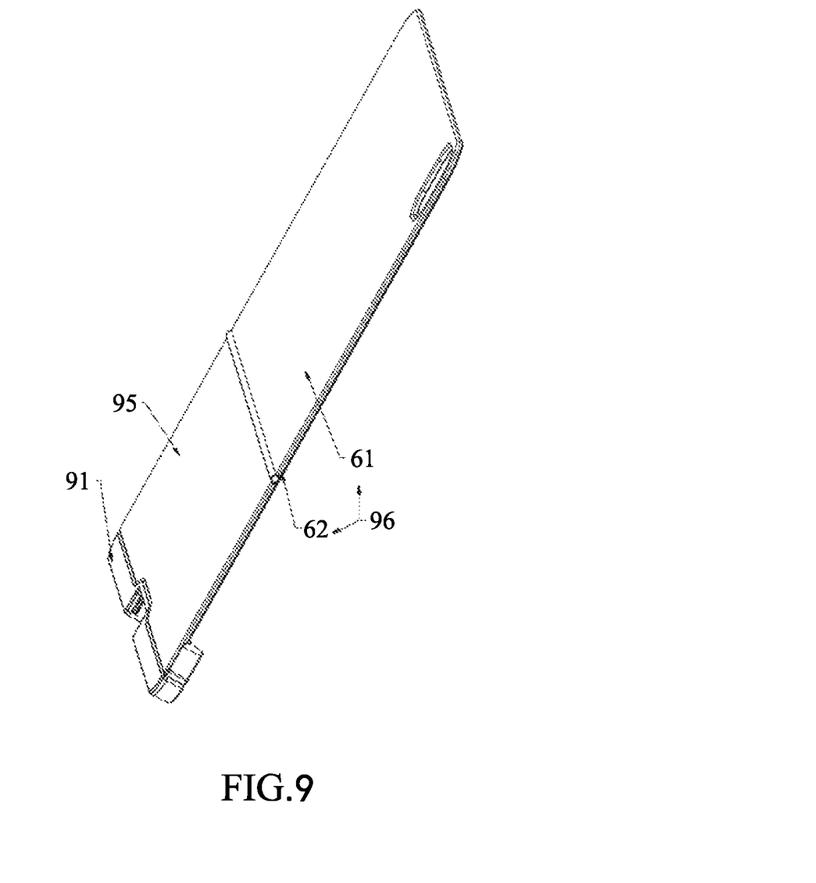
FIG. 9 is a schematic view of a structure of a support frame of the keyboard according to the present disclosure.
Figure 11:
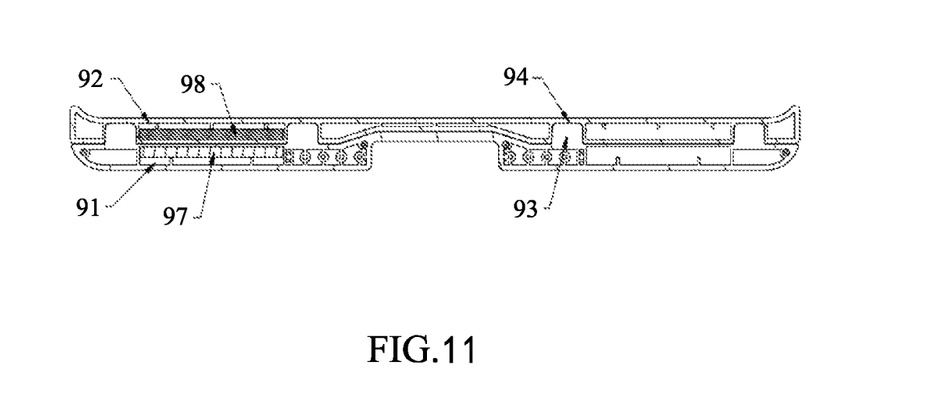
FIG. 11 is a cross-sectional view of the support frame.

The supporting main frame 92 includes a first plate body 95 detachably connected to the stand base 91, and a bearing seat 96 rotatably connected to the first plate body 95, so that after fixing the electronic device 72 with a screen to the bearing seat 96, by rotating the bearing seat 96 relative to the first plate body 95, the pitching angle of the electronic device 72 can be adjusted relative to the first plate body 95.

Of course, in addition to this, the supporting main frame 92 can also adopt other structures, for example, an integrally formed frame, as long as it can be used to support the electronic device 72 with a screen. However, the combination of the first plate body 95 and the bearing seat 96 is the optimum embodiment of the present disclosure, which can easily adjust the pitching angle of the electronic device 72 with a screen.

Further, the bearing seat 96 includes a second plate body 61 rotatably connected to the first plate body 95, and a third plate body 62; the third plate body 62 is fixed on the second plate body 61; a first magnetic member is arranged between the second plate body 61 and the third plate body 62, which is configured to magnetically attracts the electronic device 72 with a screen, and the electronic device 72 with a screen can be attracted and fixed on the bearing seat 96 by the first magnetic member.

In actual design, the first plate body 95 can also be provided with a second magnetic member, and when the electronic device 72 with a screen rotates along with the bearing seat 96 to the lower end of the electronic device 72 away from the first plate body 95, the second magnetic member cannot magnetically attract the electronic device 72 with screen; and when the bearing seat 96 rotates to abut against the first plate body 95, the electronic device 72 fixed on the bearing seat 96 can be further magnetically attracted by the second magnetic member, which can improve the stability of the fixing.

Further, the electronic device 72 with a screen can be a display screen or a tablet computer, or the like.

Further, the keyboard body 71 is a wireless keyboard body, so as to facilitate the connection between the wireless keyboard body and the electronic device 72 such as a tablet computer through wireless.

The foregoing description is merely a preferred detailed implementation of the present disclosure, but the scope of protection of the present disclosure is not limited thereto. Any people skilled in the art would be able to make equivalent replacements or changes within the technical scope disclosed by the present disclosure according to the technical solutions of the present disclosure and the inventive concept thereof, and all should be covered within the scope of protection of the present disclosure.

REFERENCE SIGNS LIST

10: mount;
11: installation cavity;
12: opening;
20: first rotating member;
21: insertion hole;
22: embedding groove;
23: abutting surface;
24: guiding arc surface;
25: rotating base;
26: cover;
30: matching device;
31: movable part;
32: spring;
61: second plate body;
62: third plate body;
71: keyboard body;
72: electronic device;
80: second rotating member;
81: first transverse rotating rod;
82: second transverse rotating rod;
90: support frame;
91: stand base;
92: supporting main frame;
93: first matching member;
94: second matching member;
95: first plate body;
96: bearing seat;
97: first magnetic member;
98: second magnetic member.

What is claimed is:
1. A keyboard with a two-way rotating support frame, comprising:
a keyboard body,
a mount arranged on the keyboard body, a first rotating member rotatably mounted on the mount and configured to rotate around a first rotation axis, and a second rotating member rotatably mounted on the first rotating member and configured to rotate relative to the first rotating member around a second rotation axis, the second rotation axis being perpendicular to the first rotation axis, one of the first rotation axis and the second rotation axis being a vertical axis;

wherein the second rotating member comprises a support frame, the support frame includes a stand base and a supporting main frame detachably connected to the stand base and configured for supporting an electronic device with a screen, wherein the stand base comprises a first matching member, and the supporting main frame comprises a second matching member, and the first matching member matches with the second matching member and is insertable into the second matching member.

2. The keyboard with a two-way rotating support frame according to claim 1, wherein the stand base comprises a first magnetic member, the supporting main frame comprises a second magnetic member; the second magnetic member is configured to magnetically attract the first magnetic member; the second matching member is an insertion groove arranged on the supporting main frame, and the first matching member is an insertion part arranged on the stand base; one of the first magnetic member and the second magnetic member is a first magnet bar, the other is an iron bar or a second magnet bar; and the insertion part is rectangular shaped or T-shaped, and a shape of the insertion groove matches a shape of the insertion part.

3. The keyboard with a two-way rotating support frame according to claim 1, wherein the supporting main frame comprises:

a first plate body detachably connected to the stand base, and a bearing seat rotatably connected to the first plate body;

the bearing seat comprising a second plate body and a third plate body fixed on the second plate body; a first magnetic member is arranged between the second plate body and the third plate body, and the first magnetic member magnetically attracts the electronic device with the screen; the first plate body comprises a second magnetic member.

4. The keyboard with a two-way rotating support frame according to claim 1, wherein the electronic device with the screen is a display screen or a tablet computer; the keyboard body is a wireless keyboard body.

5. The keyboard with a two-way rotating support frame according to claim 1, wherein the second rotating member further comprises: a first transverse rotating rod and a second transverse rotating rod; the first transverse rotating rod is rotatably mounted on one end of the first rotating member, and the second transverse rotating rod is rotatably mounted on another end of the first rotating member; and the stand base is fixedly connected with the first transverse rotating rod and the second transverse rotating rod.

6. The keyboard with a two-way rotating support frame according to claim 5, wherein a central axis of the first transverse rotating rod coincides with a central axis of the second transverse rotating rod; the second rotation axis is the central axis of the first transverse rotating rod; both the first transverse rotating rod and the second transverse rotating rod are arranged horizontally.

7. The keyboard with a two-way rotating support frame according to claim 1, wherein the mount comprises a sleeve shaft, and the first rotating member is rotatably sleeved on the sleeve shaft; the sleeve shaft is vertically arranged, and the first rotation axis is the central axis of the sleeve shaft.

8. The keyboard with a two-way rotating support frame according to claim 7, wherein the sleeve shaft comprises an installation cavity and an opening communicating with the installation cavity, the keyboard further comprises:

a matching device installed on the sleeve shaft, the matching device comprises a movable part; the movable part is movably installed in the installation cavity of the sleeve shaft, and extends through the opening; the first rotating member comprises an insertion hole, the sleeve shaft is insertable through the insertion hole, a spring is installed in the installation cavity, the spring abuts against the movable part and is configured to provide an elastic force to urge the movable part to move towards the first rotating member; a plurality of embedding grooves is defined on a hole wall of the insertion hole, the plurality of embedding grooves is circumferentially arranged around the central axis of the sleeve shaft and configured for the movable parts to embed into the insertion hole; a surface of the hole wall of the insertion hole between adjacent two of the plurality of embedding grooves is configured to abut against the movable part.

9. The keyboard with a two-way rotating support frame according to claim 8, wherein the plurality of embedding grooves are equiangular circularly arranged around the central axis of the sleeve shaft; a number of the embedding grooves is an even number; two movable parts are movably installed in the installation cavity; the spring abuts between the two movable parts; the sleeve shaft comprises two openings corresponding to the two movable parts one-to-one, the movable parts are configured to extend through the two opening respectively; one of the two openings communicates with one end of the installation cavity, and another one of the two openings communicates with the other end of the installation cavity; the installation cavity extends along a radial direction of the sleeve shaft; both sides of the embedding groove comprise a guiding arc surface or a guiding inclined surface.

* * * * *